United States Patent
Jitsukawa

(10) Patent No.: US 10,917,155 B2
(45) Date of Patent: Feb. 9, 2021

(54) MOBILE STATION, BASE STATION, AND COMMUNICATION CONTROL METHOD

(71) Applicant: FUJITSU LIMITED, Kawasaki (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/537,931

(22) Filed: Aug. 12, 2019

(65) Prior Publication Data

US 2019/0363775 A1 Nov. 28, 2019

Related U.S. Application Data

(63) Continuation of application No. 14/869,357, filed on Sep. 29, 2015, now Pat. No. 10,439,697, which is a continuation of application No. PCT/JP2013/060381, filed on Apr. 4, 2013.

(51) Int. Cl.
| | |
|---|---|
| H04B 7/06 | (2006.01) |
| H04L 25/03 | (2006.01) |
| H04W 16/28 | (2009.01) |
| H04L 5/00 | (2006.01) |

(52) U.S. Cl.
CPC ......... *H04B 7/0626* (2013.01); *H04B 7/0697* (2013.01); *H04L 25/03343* (2013.01); *H04L 25/03974* (2013.01); *H04W 16/28* (2013.01); *H04B 7/06* (2013.01); *H04L 5/0023* (2013.01)

(58) Field of Classification Search
None
See application file for complete search history.

(56) References Cited

U.S. PATENT DOCUMENTS

| | | | | |
|---|---|---|---|---|
| 2008/0298482 | A1* | 12/2008 | Rensburg | H04L 1/0009 375/260 |
| 2010/0229065 | A1 | 9/2010 | Yuda et al. | |
| 2010/0239040 | A1 | 9/2010 | Beluri et al. | |
| 2011/0019764 | A1 | 1/2011 | Chung et al. | |

(Continued)

FOREIGN PATENT DOCUMENTS

| | | |
|---|---|---|
| JP | 2010-528553 A | 8/2010 |
| JP | 2011-515915 A | 5/2011 |

(Continued)

OTHER PUBLICATIONS

Texas Instruments, "Discussion on Further DL MIMO enhancement in Rel.12", 3GPP TSG RAN WG1 #72, St Julian's Malta, Jan. 28-Feb. 1, 2013, R1-130099; Jan. 2013.

(Continued)

*Primary Examiner* — Eunsook Choi
(74) *Attorney, Agent, or Firm* — Myers Wolin, LLC

(57) ABSTRACT

A mobile station configured to perform radio communication using spatial multiplexing with a base station, the mobile station including: a controller configured to select a data unit with highest channel quality, and to select a spatial layer with highest reception quality belonging to the selected data unit; and a transmitter configured to transmit spatial coding information and first identification information to the base station, the spatial coding information corresponding to the number of spatial layers, and the first identification information identifying the spatial layer selected, and a layer indicator to determine a precoding matrix.

11 Claims, 7 Drawing Sheets

(56) References Cited

U.S. PATENT DOCUMENTS

| | | | |
|---|---|---|---|
| 2011/0222483 A1 | 9/2011 | Yuda et al. | |
| 2012/0106470 A1* | 5/2012 | Clerckx | H04B 7/0452 370/329 |
| 2013/0003788 A1* | 1/2013 | Marinier | H04B 7/0626 375/219 |
| 2013/0058386 A1* | 3/2013 | Mazzarese | H04B 7/063 375/219 |
| 2013/0322376 A1* | 12/2013 | Marinier | H04B 17/24 370/329 |
| 2014/0036796 A1* | 2/2014 | Etemad | H04N 21/23439 370/329 |
| 2015/0085750 A1* | 3/2015 | Zhang | H04B 7/0639 370/328 |

FOREIGN PATENT DOCUMENTS

| | | |
|---|---|---|
| JP | 2012-521166 A | 9/2012 |
| WO | 2006/130866 A2 | 12/2006 |
| WO | 2008-147121 A1 | 12/2008 |
| WO | 2009-022468 A1 | 2/2009 |
| WO | 2009-054145 A1 | 4/2009 |
| WO | 2009-110759 A2 | 9/2009 |
| WO | 2010-107779 A2 | 9/2010 |

OTHER PUBLICATIONS

Erik Lindskog, et al., "Closed Loop MIMO Precoding", IEEE 802.16 Broadband Wireless Access Working Group, http://www.ieee802.org/16/tge/contrib/C80216e-04_293r2.pdf, Nov. 4, 2014.

Qualcomm Incorporated,"MIMO evaluation results", 3GPP TSG-RAN WG1 Meeting #72, St. Julian's, Malta Jan. 28-Feb. 1, 2013, R1-130583, Jan. 19, 2013.

Ericsson, et al,"On CSI feedback enhancements", 3GPP TSG-RAN WG1 Meeting #72, St. Julian's, Malta, Jan. 28-Feb. 1, 2013, R1-130554, Jan. 19, 2013.

Pantech,"Further CSI Feedback Enhancement for DL MIMO in Rel. 12", 3GPP TSG RAN1 Meeting #72, St. Julian's, Malta, Jan. 28-Feb. 1, 2013, R1-130521, Jan. 19, 2013.

Fujitsu,"Consideration regarding additional information for new aperiodic PUSCH feedback mode", 3GGP TSG RAN WG1 Meeting #72bis, R1-131095, Apr. 5, 2013.

International Search Report issued for corresponding International Patent Application No. PCT/JP2013/060381, dated May 14, 2013, English translation attached.

Extended European Search Report issued for corresponding European Patent Application No. 13880976.9 dated Feb. 18, 2016.

Notice of Preliminary Office Action issued for corresponding Korean Patent Application No. 10-2015-7026425, dated Nov. 4, 2016. English translation attached.

Notice of Preliminary Office Action issued for corresponding Korean Patent Application No. 10-2015-7026425, dated Mar. 31, 2017. English translation attached.

First Notification of Office Action issued for corresponding Chinese Patent Application No. 201380075248.8, dated May 27, 2017. English translation attached.

Notice of Last Preliminary Rejection Office Action issued for corresponding Korean Patent Application No. 10-2015-7026425, dated Dec. 22, 2017. English translation attached.

Fujitsu, "Codeword to Layer Mapping for Multiple Layers MIMO Systems", 3GPPP TSG-RAN1 #60b, R1-102359, Apr. 12-16, 2010, Beijing, China. (cited in KROA mailed on Dec. 22, 2017 for corresponding Korean Application No. 10-2015-7026425).

Non-Final Office Action issued by the USPTO dated Feb. 13, 2017 for corresponding U.S. Appl. No. 14/869,357, electronically delivered on Feb. 13, 2017.

Final Office Action issued by the USPTO dated Jun. 15, 2017 for corresponding U.S. Appl. No. 14/869,357, electronically delivered on Jun. 15, 2017.

Non-Final Office Action issued by the USPTO dated Mar. 22, 2018 for corresponding U.S. Appl. No. 14/869,357, electronically delivered on Mar. 22, 2018.

Final Office Action issued by the USPTO dated Oct. 22, 2018 for corresponding U.S. Appl. No. 14/869,357, electronically delivered on Oct. 22, 2018.

* cited by examiner

FIG.7

| TRANSMISSION RANK | Code word 1 (CQI 1) | Code word 2 (CQI 2) |
|---|---|---|
| RANK 1 | LAYER 1 | --- |
| RANK 2 | LAYER 1 | LAYER 2 |
| RANK 3 | LAYER 1 | LAYER 2, 3 |
| RANK 4 | LAYER 1, 2 | LAYER 3, 4 |
| RANK 5 | LAYER 1, 2 | LAYER 3, 4, 5 |
| RANK 6 | LAYER 1, 2, 3 | LAYER 4, 5, 6 |
| RANK 7 | LAYER 1, 2, 3 | LAYER 4, 5, 6, 7 |
| RANK 8 | LAYER 1, 2, 3, 4 | LAYER 5, 6, 7, 8 |

FIG.8

| TRANSMISSION RANK | LI | REMARK |
|---|---|---|
| RANK 1 | ZERO BIT | APPLY PRECODING FOR PDSCH |
| RANK 2 | ZERO BIT | QUALITY OF SPATIAL LAYER MAY BE DETERMINED BY CQI |
| RANK 3, 4 | ONE BIT | |
| RANK 5, 6, 7, 8 | TWO BITS | |

| CSI PROCESS | CONTROL INFORMATION FOR PRECODING IN CONVENTIONAL TECHNOLOGY | CONTROL INFORMATION FOR PRECODING IN THIS EMBODIMENT |
|---|---|---|
| #1 | RECOMMENDED PMI OF RECOMMENDED RANK FOR SU-MIMO (FOUR BITS) | RECOMMENDED PMI OF RECOMMENDED LAYER FOR SU-MIMO (FOUR BITS) |
| #2 | RECOMMENDED PMI OF RANK 1 (FOUR BITS) | LI OF MOST EXCELLENT LAYER (TWO BITS) |
| #3 | RECOMMENDED PMI OF RANK 2 (FOUR BITS) | LI OF SECOND MOST EXCELLENT LAYER (TWO BITS) |

| CSI PROCESS | CONTROL INFORMATION FOR PRECODING IN CONVENTIONAL TECHNOLOGY | CONTROL INFORMATION FOR PRECODING IN THIS EMBODIMENT |
|---|---|---|
| #1 | RECOMMENDED PMI OF RECOMMENDED RANK FOR SU-MIMO (FOUR BITS) | RECOMMENDED PMI OF RECOMMENDED RANK FOR SU-MIMO (FOUR BITS) |
| #2 | RECOMMENDED PMI OF RANK 1 (FOUR BITS) | LI OF MOST EXCELLENT LAYER (TWO BITS) + NUMBER OF CODE WORD TO WHICH THIS LAYER BELONGS (ONE BIT) |
| #3 | RECOMMENDED PMI OF RANK 2 (FOUR BITS) | LI OF SECOND MOST EXCELLENT LAYER (TWO BITS) + NUMBER OF CODE WORD TO WHICH THIS LAYER BELONGS (ONE BIT) |

MOBILE STATION, BASE STATION, AND COMMUNICATION CONTROL METHOD

CROSS-REFERENCE TO RELATED APPLICATION

This application is a continuation application of U.S. application Ser. No. 14/869,357 filed on Sep. 29, 2015, which is a continuation application of International Application PCT/JP2013/060381, filed on Apr. 4, 2013, and designating the U.S., the entire contents of each are incorporated herein by reference.

FIELD

The present invention relates to a mobile station, a base station, and a communication control method.

BACKGROUND

Conventionally, in a radio communication system to which long term evolution (LTE) is applied, a communication controlling procedure referred to as closed-loop precoding is used in down link (DL) from a base station (eNB: eNodeB) to a mobile station (UE: User Equipment). In the closed-loop precoding, the base station uses spatial multiplexing to simultaneously transmit a plurality of data streams and rank adaptation to adaptively control the number of data streams (spatial layers) (transmission ranks) to be spatially multiplexed together to form a directional beam by multi antenna. The mobile station selects an optimal one from a precoding matrix defined for each rank to feed back to the base station.

Specifically, in the closed-loop precoding, the mobile station feeds back channel state information (CSI) indicating a channel state to the base station. The above-described CSI includes a rank indicator (RI) indicating a recommended transmission rank, a precoding matrix indicator (PMI) indicating a recommended precoding matrix, and a channel quality indicator (CQI) indicating radio channel quality when the above-described RI and PMI are assumed. When the base station receives the above-described CSI from the mobile station, this applies the precoding matrix determined based on the above-described RI and PMI to UE-specific reference signals (RS) and a physical downlink shared channel (PDSCH) to transmit to the mobile station. The mobile station which receives the above-described precoding matrix demodulates the PDSCH by using a channel estimation value based on the UE-specific RS.

As described above, a conventional CSI feedback method assumes PDSCH transmission to which single user-multiple input multiple output (SU-MIMO) being spatial multiplexing technology of signals to one mobile station is applied. Therefore, the base station selects a rank according to the radio channel quality and the precoding matrix for the rank putting importance on transmission efficiency to one mobile station on the assumption that reliability is assured by retransmission control.

Non Patent Document 1: IEEE 802.16 Broadband Wireless Access Working Group Closed Loop MIMO Precoding (2004 Nov. 4), http://www.ieee802.org/16/tge/contrib/C80216e-04_293r2.pdf However, technology of dynamically switching between the above-described SU-MIMO and MU-MIMO (multiple user-multiple input multiple output) being spatial multiplexing technology of signals to a plurality of mobile stations is recently developed. Technology of applying the closed-loop precoding to an EPDCCH (enhanced physical downlink control channel) supporting the spatial multiplexing in addition to conventional time multiplexing is also developed. Therefore, expansion of the CSI feedback method from the mobile station to the base station is desired in order to keep line with the technology.

A feedback method of a multiple CSI process is suggested, for example, as a new CSI feedback method. In such method, the mobile station has codebook subset restriction for each CSI process and feeds back the CSI within a range of the RI and PMI restricted according to a bitmap indicated by a higher layer. As an application example, the mobile station feeds back the CSI assuming the SU-MIMO of the recommended rank of a connected cell in a CSI process 1. The mobile station feeds back the CSI assuming the MU-MIMO and the EPDCCH of a rank 1 of the connected cell in a CSI process 2. Furthermore, the mobile station feeds back the CSI assuming the MU-MIMO and the EPDCCH of a rank 2 of the connected cell in a CSI process 3.

In this manner, in the above-described CSI feedback method, the mobile station transmits the CSI (for example, 12 bits) two or three times as large as conventional one to the base station though system performance is improved. Overhead of control information transmitted by the mobile station to the base station at the time of the CSI feedback significantly increases with this.

SUMMARY

According to an aspect of the embodiments, a mobile station is configured to perform radio communication using spatial multiplexing with a base station. The mobile station includes a selecting unit and a transmitting unit. The selecting unit selects a data unit with highest channel quality from a plurality of data units and selects a spatial layer with highest reception quality from spatial layers belonging to the data unit. The transmitting unit transmits identification information of the spatial layer selected by the selecting unit to the base station as control information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a view for illustrating a process in which a CSI calculating unit of the mobile station determines an LI based on a transmission rank and a code word;

FIG. 8 is a view illustrating the number of bits of the LI for each transmission rank;

FIG. 9 is a view illustrating control information for precoding according to an embodiment for each CSI process; and FIG. 10 is a view illustrating control information for precoding according to a variation for each CSI process.

DESCRIPTION OF EMBODIMENTS

An embodiment of a mobile station, a base station, and a communication control method disclosed in the present application is hereinafter described in detail with reference to the drawings. Meanwhile, the mobile station, the base station, and the communication control method disclosed in the present application are not limited by the following embodiment.

Figure 1:
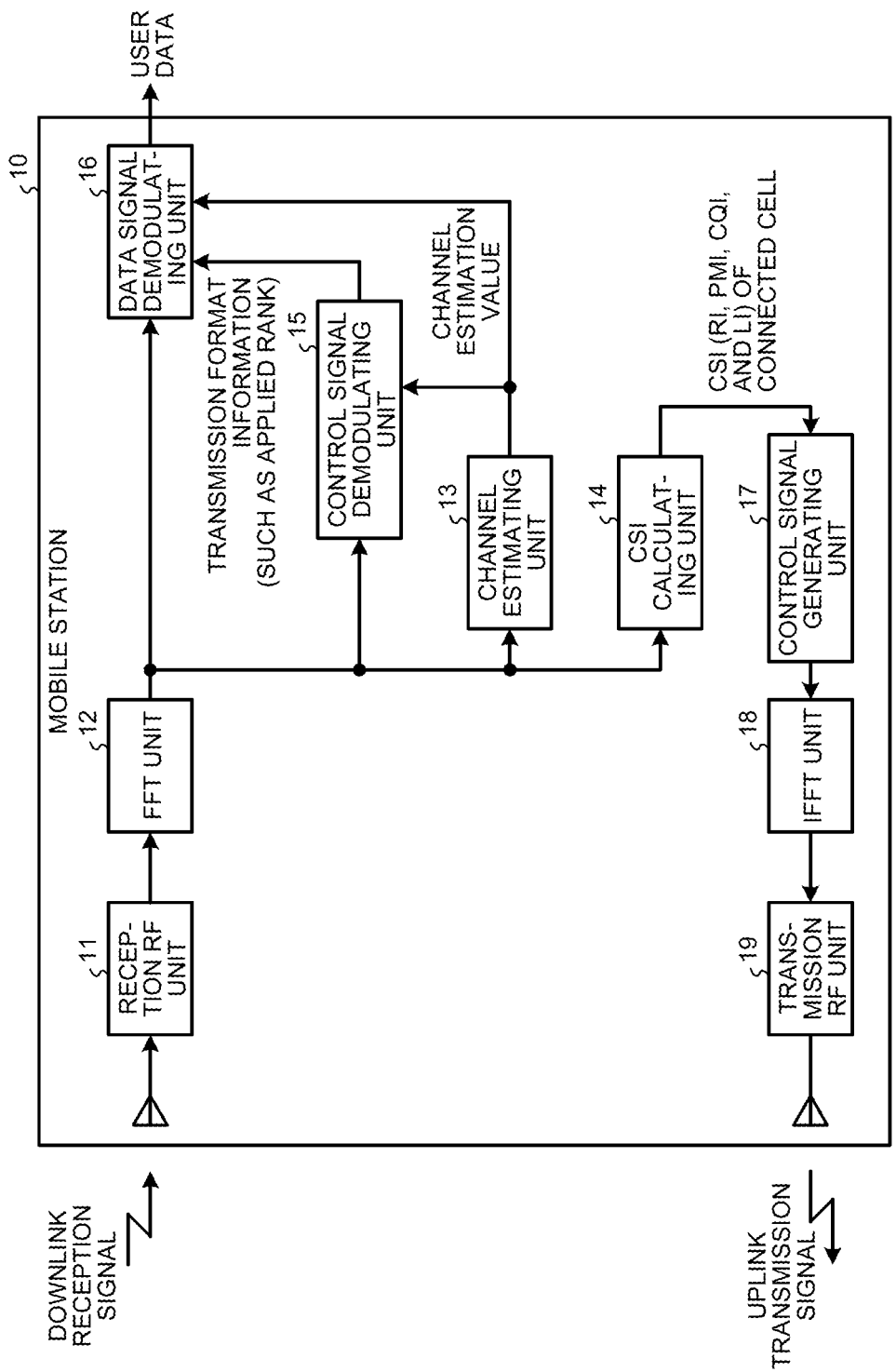
FIG. 1 is a block diagram illustrating a functional configuration of a mobile station.

A configuration of a mobile station (UE) according to one embodiment disclosed in the present application is first described. FIG. 1 is a block diagram illustrating a functional configuration of a mobile station 10. As illustrated in FIG. 1, the mobile station 10 includes a reception radio frequency (RF) unit 11, a fast Fourier transform (FFT) unit 12, a channel estimating unit 13, a CSI calculating unit 14, a control signal demodulating unit 15, a data signal demodulating unit 16, a control signal generating unit 17, an inversed fast Fourier transform (IFFT) unit 18, and a transmission RF unit 19. The components are connected to one another so as to be able to unidirectionally or bidirectionally input/output signals and data.

The reception RF unit 11 performs conversion from a radio frequency to a base band, orthogonal demodulation, and A/D (analog to digital) conversion on a signal received from a base station 20. The FFT unit 12 detects FFT timing from the signal received by the reception RF unit 11, removes a CP (cyclic prefix) therefrom, and performs FFT processing thereon. The channel estimating unit 13 extracts UE-specific RS being reference signals for demodulating data from the received signal after the FFT processing. The channel estimating unit 13 calculates a channel estimation value from cross correlation between the UE-specific RS and a known reference signal.

The CSI calculating unit 14 extracts channel state information (CSI)-reference signals (RS) being reference signals for measuring channel quality from the received signal after the FFT processing. The CSI calculating unit 14 calculates a channel estimation value being radio channel distortion represented by a complex number from cross correlation between the CSI-RS and a known reference signal. Furthermore, the CSI calculating unit 14 selects a rank and a precoding matrix for SU-MIMO by using the channel estimation value, and thereafter determines an RI and a PMI based on the values. The CSI calculating unit 14 specifies a CQI of each code word assuming the determined RI and PMI and determines a layer indicator (LI) based on the CQI and a reception signal to interference and noise ratio (SINR) of each layer. Herein, the code word is a unit of coding bit string regarding the data transmitted on PDSCH and the data transmitted in one sub frame is divided up to two code words according to the rank.

The control signal demodulating unit 15 extracts a control signal from the received signal after the FFT processing and performs channel compensation by using the above-described channel estimation value. The control signal demodulating unit 15 restores transmission format information such as an applied rank as the control information by performing data demodulation and error correction decoding. The data signal demodulating unit 16 extracts a data signal from the received signal after the FFT processing and performs the channel compensation by using the above-described channel estimation value. The data signal demodulating unit 16 restores an information bit by performing the data demodulation and the error correction decoding based on the above-described transmission format information.

The control signal generating unit 17 performs error correction coding, data modulation and the like on control information including the CSI (such as the above-described RI, PMI, CQI, and LI) of a cell to which the mobile station 10 is connected. The IFFT unit 18 executes IFFT processing on the signal transmitted to the base station 20 and adds the CP thereto. The transmission RF unit 19 performs digital to analog (D/A) conversion, orthogonal modulation, and conversion from the base band to the radio frequency on the signal to be transmitted.

Figure 2:
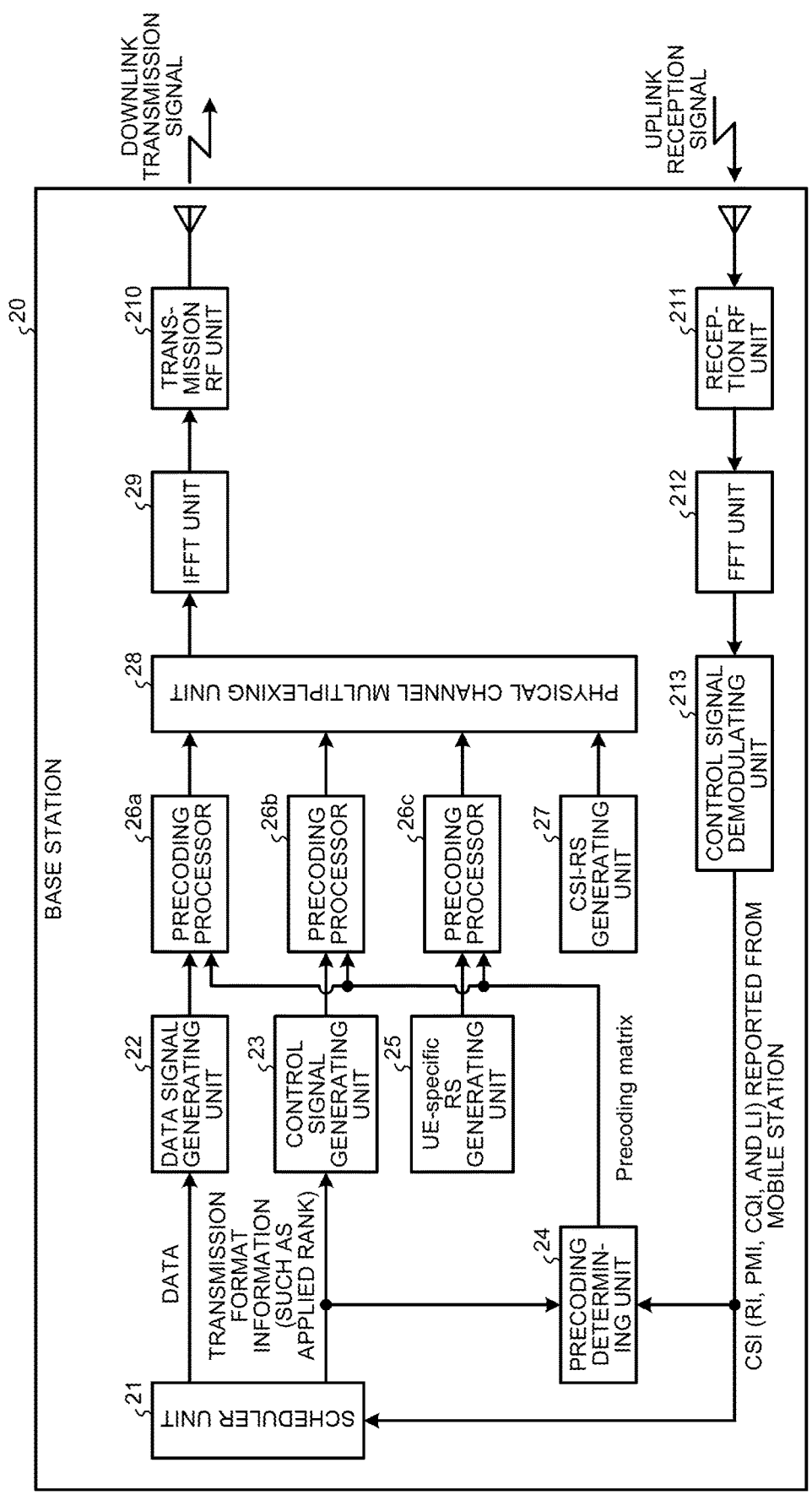
FIG. 2 is a block diagram illustrating a functional configuration of a base station.

A configuration of the base station (eNB) according to one embodiment disclosed in the present application is next described. FIG. 2 is a block diagram illustrating a functional configuration of the base station 20. As illustrated in FIG. 2, the base station 20 includes a scheduler unit 21, a data signal generating unit 22, a control signal generating unit 23, a precoding determining unit 24, a UE-specific RS generating unit 25, and precoding processors 26a, 26b, and 26c. The base station 20 also includes a CSI-RS generating unit 27, a physical channel multiplexing unit 28, an IFFT unit 29, a transmission RF unit 210, a reception RF unit 211, a FFT unit 212, and a control signal demodulating unit 213. The components are connected to one another so as to be able to unidirectionally or bidirectionally input/output signals and data.

The scheduler unit 21 assigns frequency resources to each mobile station connected to the base station 20 and selects the transmission format (such as the applied rank). The data signal generating unit 22 performs the error correction coding and the data modulation on the data input from the scheduler unit 21. The control signal generating unit 23 performs the error correction coding and the data modulation on the control information including the transmission format information such as the applied rank. The precoding determining unit 24 determines the precoding matrix for the SU-MIMO based on the RI and the PMI reported from the mobile station 10 and determines the precoding matrices for ranks 1 and 2 based on the CQI and the LI. The precoding determining unit 24 outputs each precoding matrix corresponding to the PDSCH and EPDCCH of a MIMO format (SU-MIMO or MU-MIMO) determined by the scheduler unit 21 to each of precoding processors 26a, 26b, and 26c. The UE-specific RS generating unit 25 generates the above-described UE-specific RS. Each of the precoding processors 26a, 26b, and 26c executes precoding processing based on each precoding matrix input from the precoding determining unit 24.

The CSI-RS generating unit 27 generates the above-described CSI-RS. The physical channel multiplexing unit 28 performs frequency multiplexing of physical channels. The IFFT unit 29 executes the IFFT processing on the signal transmitted to the mobile station 10 and adds the CP thereto. The transmission RF unit 210 performs the D/A conversion, the orthogonal modulation, and the conversion from the base band to the radio frequency on the signal to be transmitted. The reception RF unit 211 performs the conversion from the radio frequency to the base band, the orthogonal demodulation, and the A/D conversion on the signal received from the mobile station 10. The FFT unit 212 detects the FFT timing from the signal received by the reception RF unit 211, removes the CP therefrom, and performs the FFT processing thereon. The control signal demodulating unit 213 extracts the control signal and DM-RS of up-link not illustrated from the received signal after the FFT processing and performs the channel compensation by using the channel estimation value obtained from the above-described DM-RS. The control signal demodulating unit 213 restores the CSI (such as the above-described RI, PMI, CQI, and LI) reported from the mobile station 10 as the above-described control information by performing the data demodulation and error correction decoding.

Figure 3:
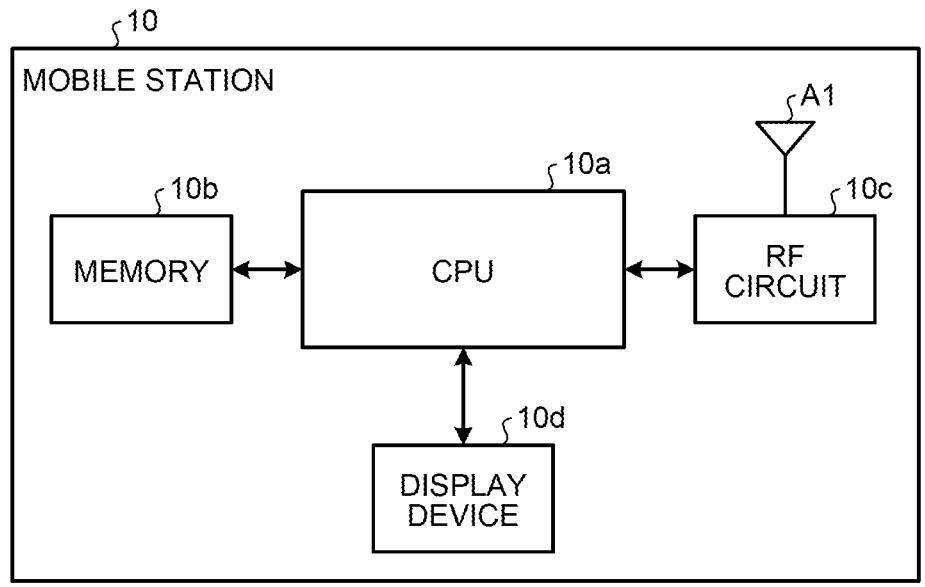
FIG. 3 is a block diagram illustrating a hardware configuration of the mobile station.

The mobile station 10 is realized by a portable terminal such as a cellular phone and a smartphone, for example. FIG. 3 is a block diagram illustrating a hardware configuration of the mobile station 10. As illustrated in FIG. 3, the mobile station 10 includes a central processing unit (CPU) 10a, a memory 10b, an RF circuit 10c including an antenna A1, and a display device 10d such as a liquid crystal display (LCD) and an electroluminescence (EL) as hardware. The memory 10b is a random access memory (RAM) such as a synchronous dynamic random access memory (SDRAM), a read only memory (ROM), and a flash memory, for example. Components other than the reception RF unit 11 and the transmission RF unit 19 out of functional components illustrated in FIG. 1 are realized by an integrated circuit such as the CPU 10a, for example, regarding correspondence relationship between the functional configuration and the hardware configuration. The reception RF unit 11 and the transmission RF unit 19 are realized by the RF circuit 10c.

Figure 4:
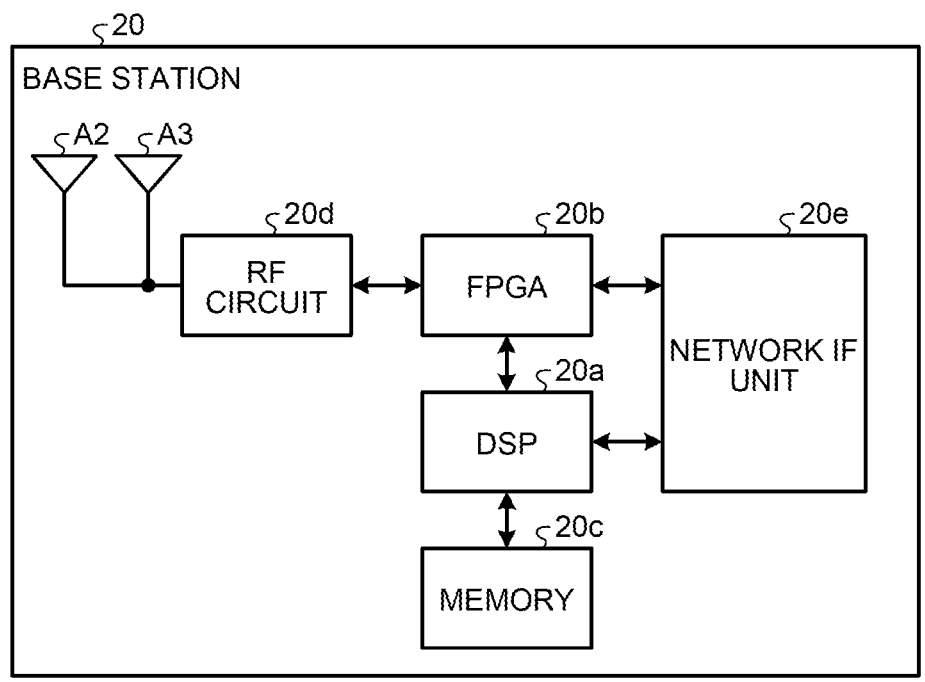
FIG. 4 is a block diagram illustrating a hardware configuration of the base station.

FIG. 4 is a block diagram illustrating a hardware configuration of the base station 20. As illustrated in FIG. 4, the base station 20 includes a digital signal processor (DSP) 20a, a field programmable gate array (FPGA) 20b, a memory 20c, a radio frequency (RF) circuit 20d, and a network inter face (IF) unit 20e as hardware components. The DSP 20a and the FPGA 20b are connected to each other so as to be able to input/output various signals and data through the network IF unit 20e such as a switch. The RF circuit 20d includes antennas A2 and A3. The memory 20c is a RAM such as an SDRAM, a ROM, and a flash memory, for example. Components other than the transmission RF unit 210 and the reception RF unit 211 out of functional components illustrated in FIG. 2 are realized by an integrated circuit such as the DSP 20a, the FPGA 20b and the like, for example, regarding correspondence relationship between the functional configuration and the hardware configuration. The transmission RF unit 210 and the reception RF unit 211 are realized by the RF circuit 20d.

Figure 5:
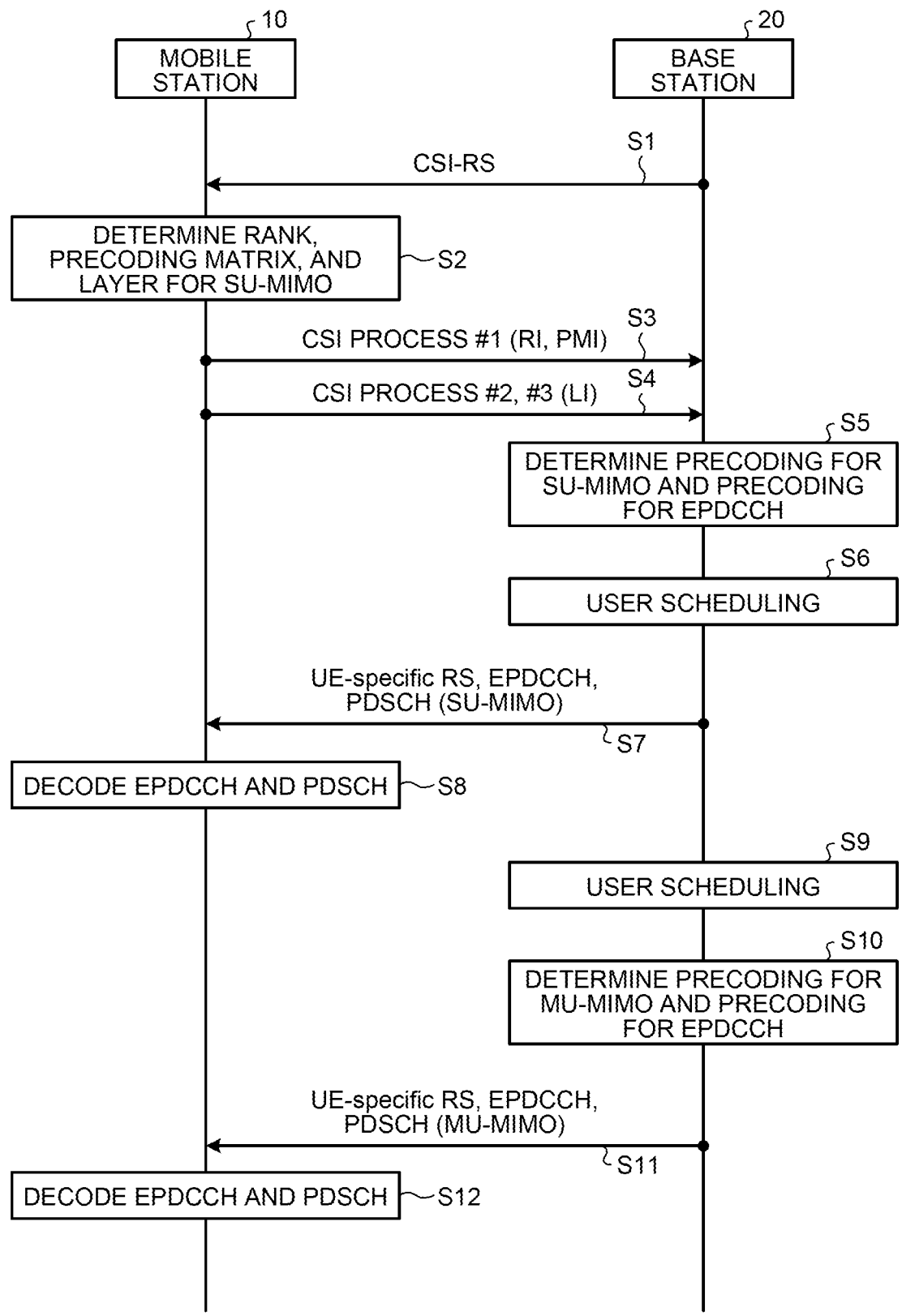
FIG. 5 is a sequence diagram for illustrating operation of the mobile station and the base station.

Operation is next described. FIG. 5 is a sequence diagram for illustrating the operation of the mobile station 10 and the base station 20.

First, when the CSI calculating unit 14 of the mobile station 10 receives the CSI-RS from the base station 20 (S1), this determines the rank, the precoding matrix, and the layer for the SU-MIMO by using the CSI-RS (S2).

At S3, the transmission RF unit 19 of the mobile station 10 transmits the RI and the PMI indicating the rank and the precoding matrix determined at S2 to the base station 20 in a CSI process #1. Meanwhile, the mobile station 10 may transmit the CQI indicating the radio channel quality when the above-described RI and PMI are assumed together at S3.

At S4, the transmission RF unit 19 of the mobile station 10 transmits the LI indicating the layer determined at S2 to the base station 20 in CSI processes #2 and #3. Meanwhile, the mobile station 10 may transmit the CQI indicating the radio channel quality when the above-described LI is assumed together at S4.

At S5, the precoding determining unit 24 of the base station 20 determines the precoding for the SU-MIMO by using the above-described RI and PMI received in the CSI process #1 at S3 and determines the precoding for the MU-MIMO and the precoding for the EPDCCH by using the above-described LI received in the CSI processes #2 and #3 at S4.

At S6, the scheduler unit 21 of the base station 20 performs user scheduling based on the precoding for the SU-MIMO and precoding for the MU-MIMO determined by the precoding determining unit 24 at S5. That is to say, the scheduler unit 21 determines the MIMO format (SU-MIMO) applied to the PDSCH to the mobile station 10.

At S7, the base station 20 applies the precoding for the EPDCCH calculated from the above-described RI, PMI, and LI to the EPDCCH and the UE-specific RS for demodulating the same, applies the precoding for the PDSCH of the SU-MIMO to the PDSCH and the UE-specific RS for demodulating the same by the precoding processors 26a, 26b, and 26c to transmit to the mobile station 10 by the transmission RF unit 210. Herein, note that the UE-specific RS for demodulating the PDSCH and the UE-specific RS for demodulating the EPDCCH might be transmitted by using different frequency resources according to the physical channel to be demodulated and the different precodings might be applied thereto.

At S8, the channel estimating unit 13 of the mobile station 10 performs channel estimation based on the above-described UE-specific RS for demodulating to decode the EPDCCH and the PDSCH.

At S9, the precoding determining unit 24 of the base station 20 determines the precoding for the SU-MIMO by using the above-described RI and PMI received in the CSI process #1 at S3 and determines the precoding for the MU-MIMO and the precoding for the EPDCCH by using the above-described LI received in the CSI processes #2 and #3 at S4.

At S10, the scheduler unit 21 of the base station 20 performs the user scheduling based on the precoding for the SU-MIMO and the precoding for the MU-MIMO determined by the precoding determining unit at S9. That is to say, the scheduler unit 21 determines the MIMO format (MU-MIMO applied to the PDSCH to the mobile station 10.

At S11, the base station 20 applies the precoding for the EPDCCH calculated from the above-described RI, PMI, and LI to the EPDCCH and the UE-specific RS for demodulating the same, applies the precoding for the PDSCH of the MU-MIMO to the PDSCH and the UE-specific RS for demodulating the same by the precoding processors 26a, 26b, and 26c to transmit to the mobile station 10 by the transmission RF unit 210.

At S12, the channel estimating unit 13 of the mobile station 10 performs the channel estimation based on the above-described UE-specific RS for demodulating to decode the EPDCCH and the PDSCH. At that time, the mobile station 10 is not aware of the applied precoding.

Hereinafter, a CSI feedback method from the mobile station 10 to the base station 20 is more specifically described with reference to FIGS. 6 to 10.

Figure 6:
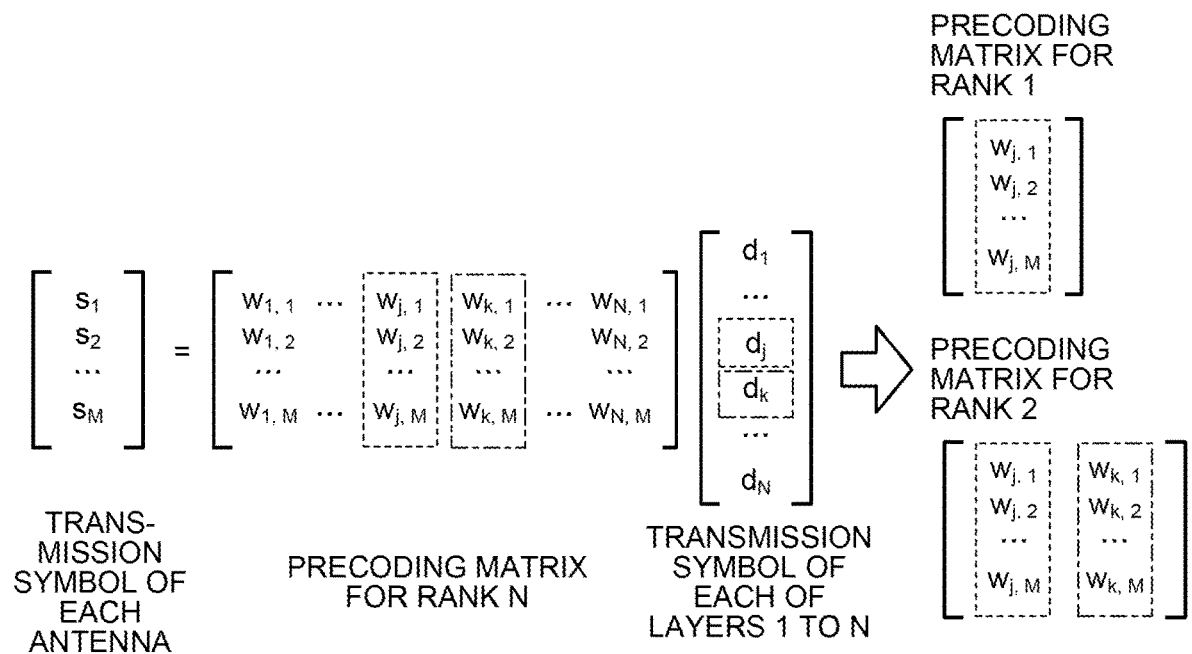
FIG. 6 is a view for illustrating a process in which a precoding determining unit of the base station determines a precoding matrix for each rank from a transmission symbol of each antenna.

FIG. 6 is a view for illustrating a process in which the precoding determining unit 24 of the base station 20 determines the precoding matrix for each rank as a subset of the precoding matrix for the PDSCH to which the SU-MIMO is applied. In FIG. 6, M being an integer not smaller than 2 represents the number of antennas included in the base station 20. N being an integer not smaller than 2 represents the number of ranks (layers) of spatial multiplexing. Being integers not larger than N, j and k represent layer numbers. The radio channel quality satisfies layer j>layer k. The precoding determining unit 24 of the base station 20 selects a precoding vector of the layer with high radio channel quality from each column vector forming the precoding matrix for the PDSCH to which the SU-MIMO is applied based on the LI selected by the mobile station 10. The precoding vector is applied to the transmission on the PDSCH or the EPDCCH to which the MU-MIMO is applied.

In FIG. 6, each column vector described above is the precoding vector corresponding to each of spatially multiplexed layers. For example, the precoding vector corresponding to the layer j is "$w_{j,1}, w_{j,2}, \ldots, w_{j,M}$" enclosed by a broken line. As illustrated in FIG. 6, in the transmission of a transmission rank 1, one precoding vector forms the precoding matrix for the rank 1. On the other hand, the precoding vector corresponding to the layer k is "$w_{k,1}, w_{k,2}, \ldots, w_{k,M}$" enclosed by a dashed line, for example. As illustrated in FIG. 6, in the transmission of a transmission rank 2, the two vectors which are this precoding vector and the precoding vector corresponding to the above-described layer j form the precoding matrix for the rank 2.

FIG. 7 is a view for illustrating a process in which the CSI calculating unit 14 of the mobile station 10 determines the LI based on the transmission rank and the code word. As described above, the CQI is calculated in association with the code word being the unit of the coding bit string regarding the data transmitted on the PDSCH. Each layer is associated with any code word. The CSI calculating unit 14 of the mobile station 10 first specifies the code word with high quality based on the CQI and further selects a spatial layer with excellent reception SINR from the layers belonging to the code word. An identifier of the selected spatial layer becomes the LI to be fed back to the base station 20. As illustrated in FIG. 7, in a case in which there is notice of "RI=2" as the transmission rank, for example, a layer 1 belonging to a code word 1 is selected when CQI1≥CQI2 is satisfied, and a layer 2 belonging to a code word 2 is selected when CQI1<CQI2 is satisfied. In a case in which there is the notice of "RI=6" as the transmission rank, for example, the layer with the highest reception SINR (for example, layer 1) from the layers 1 to 3 belonging to the code word 1 is selected when CQI1 CQI2 is satisfied. Furthermore, in a case in which there is the notice of "RI=8" as the transmission rank, for example, the layer with the highest reception SINR (for example, layer 5) from the layers 5 to 8 belonging to the code word 2 is selected when CQI1<CQI2 is satisfied.

FIG. 8 is a view illustrating the number of bits of the LI for each transmission rank. As illustrated in FIG. 8, the necessity of the LI depends on a recommended rank assuming the SU-MIMO. Therefore, the control signal generating unit 17 of the mobile station 10 may efficiently transmit the control information by switching the number of bits of the LI according to the RI fed back to the base station 20. In FIG. 8, when the transmission rank is rank 3 or 4, for example, the mobile station 10 selects one layer from two (=2 to the first power) layers, so that the number of bits of the LI is set to one. When the transmission rank is rank 5 to 8, for example, the mobile station 10 selects one layer from four (=2 to the second power) layers, so that the number of bits of the LI is set to two.

FIG. 9 is a view illustrating the control information for precoding according to the embodiment for each CSI process. As illustrated in FIG. 9, the mobile station 10 transmits a recommended PMI of the recommended rank for the SU-MIMO to the base station 20 as the control information for precoding as in the conventional case in the CSI process #1. On the other hand, in the CSI process #2, the mobile station 10 transmits the LI of the layer with the most excellent reception SINR to the base station 20 as the control information for precoding. According to this, the number of bits of the control information in the CSI process #2 is reduced from conventional four bits to two bits. Similarly, in the CSI process #3, the mobile station 10 transmits the LI of the layer with the second most excellent reception SINR to the base station 20 as the control information for precoding. According to this, the number of bits of the control information in the CSI process #3 also is reduced from conventional four bits to two bits. Alternatively, the LI transmitted to the base station 20 in the CSI process #3 may correspond to the layer selected such that a communication capacity of the rank 2 transmission is the maximum. That is to say, when selecting two column vectors for generating the precoding matrix for the rank 2 from the precoding matrix corresponding to the recommended PMI for the SU-MIMO, a first column vector may be the column vector corresponding to the LI transmitted in the CSI process #2 and a second column vector may be the column vector with the maximum communication capacity when combined with the column vector corresponding to the CSI process #2.

The base station 20 determines the precoding matrix of the transmission rank 1 by using the control information (LI) received from the mobile station 10 in the CSI process #2. The base station 20 determines the precoding matrix of the transmission rank 2 by using the control information (LI) received from the mobile station 10 in the CSI process #3. In this manner, the base station 20 may determine the precoding matrix by receiving not the precoding matrix itself but only the LI. As a result, the control information may be efficiently transmitted/received.

As described above, the mobile station 10 performs the radio communication using the spatial multiplexing with the base station 20. The mobile station 10 includes the CSI calculating unit 14 and the transmission RF unit 19. The CSI calculating unit 14 selects a data unit with the highest channel quality (for example, CQI) from a plurality of data units (code words 1 and 2 in FIG. 7) and selects the spatial layer with the highest reception quality (for example, SINR) from the spatial layers belonging to the data unit. The transmission RF unit 19 transmits identification information (for example, LI) of the spatial layer selected by the CSI calculating unit 14 to the base station 20 as the control information.

In the mobile station 10, the transmission RF unit 19 may transmit spatial coding information (for example, RI and PMI illustrated at S3 in FIG. 5) corresponding to the number of spatial layers recommended in the above-described spatial multiplexing to the base station 20 as first channel state information (for example, CSI process #1). Thereafter, the transmission RF unit 19 may transmit the identification information (for example, LI illustrated at S4 in FIG. 5) of the spatial layer with the highest reception quality (for example, SINR) described above to the base station 20 as second channel state information (for example, CSI process #2).

In the mobile station 10, the transmission RF unit 19 may transmit the identification information (for example, LI illustrated at S4 in FIG. 5) of the spatial layer with the second highest reception quality (for example, SINR) described above to the base station 20 as third channel state information (for example, CSI process #3) subsequent to the above-described second channel state information.

On the other hand, the base station 20 performs the radio communication using the spatial multiplexing with the mobile station 10. The base station 20 includes the reception RF unit 211, the precoding determining unit 24, and the precoding processors 26a, 26b, and 26c. The reception RF unit 211 receives the identification information (for example, LI) of the spatial layer with the highest reception quality (for example, SINR) from the mobile station 10. The above-described spatial layer is selected, after the data unit with the highest channel quality (for example, CQI) is selected from a plurality of data units (for example, code words 1 and 2), from the spatial layers belonging to the data unit in the mobile station 10. The precoding determining unit 24 determines the spatial coding information (for example, precoding matrix) by using the identification information of the spatial layer described above received by the reception RF unit 211. The precoding processors 26a, 26b, and 26c execute the above-described spatial multiplexing based on the spatial coding information determined by the precoding determining unit 24.

Specifically, the mobile station 10 performs the channel estimation by using the CSI-RS to obtain a matrix H indicating the channel distortion in the MIMO channel between the mobile station 10 and the base station 20 when determining the above-described LI. The mobile station 10 estimates thermal noise and power of interference from dispersion of the channel estimation value.

Next, the mobile station 10 selects the rank and the precoding matrix with the largest communication capacity from all candidates of the rank and the precoding matrices as the rank and the precoding matrix for the SU-MIMO. That is to say, the CSI calculating unit 14 estimates received power of each layer by multiplication of the precoding matrix, a channel matrix, and a reception antenna weight matrix and divides the received power by the thermal noise and the power of interference, thereby estimating the reception SINR of each layer. Furthermore, the CSI calculating unit 14 specifies a modulation and coding scheme (MCS) of each code word by averaging the estimated reception SINR to calculate the reception SINR of each code word. Then, the CSI calculating unit 14 estimates the communication capacity by adding corresponding expected throughput between the layers.

Thereafter, the mobile station 10 obtains the CQI from the reception SINR of each code word when the rank and the precoding matrix for the SU-MIMO are applied. The mobile station 10 selects the layer with the high reception SINR (for example, top one or two) from the code word with the highest CQI and reports the identifier of the layer to the base station 20 by the LI.

According to this, the mobile station 10 may report the channel state (CSI feedback) to the base station 20 with small control information. As a result, closed-loop precoding suitable for each MIMO format (for example, SU-MIMO and MU-MIMO) and each physical channel (for example, PDSCH and EPDCCH) may be realized with smaller overhead of the control information.

(Variation)

A mobile station 10 feeds back an LI of a layer with an excellent reception SINR from a code word with a higher CQI in the above-described embodiment. However, the CQI is an indicator indicating average channel quality in the code word, so that the layer having the most excellent reception SINR in all the code words does not always belong to the code word with the higher CQI. Therefore, a CSI calculating unit 14 of the mobile station 10 may select the layer having the most excellent reception SINR from all the code words regardless of whether the CQI is high.

FIG. 10 is a view illustrating control information for precoding according to a variation for each CSI process. As illustrated in FIG. 10, the mobile station 10 transmits a recommended PMI of a recommended rank for SU-MIMO to a base station 20 as the control information for precoding as in the conventional case in a CSI process *1. On the other hand, in a CSI process *2, the mobile station 10 transmits the LI of the layer with the most excellent reception SINR and a number of the code word to which the layer belongs to the base station 20 as the control information for precoding. According to this, the number of bits of the control information in the CSI process #2 is reduced from conventional four bits to three (=two+one) bits. Similarly, in a CSI process #3, the mobile station 10 transmits the LI of the layer with the second most excellent reception SINR and the number of the code word to which the layer belongs to the base station 20 as the control information for precoding. According to this, the number of bits of the control information in the CSI process #3 also is reduced from conventional four bits to three (=two+one) bits.

In such an aspect, the CSI calculating unit 14 of the mobile station 10 selects a spatial layer with the highest reception quality (for example, SINR) from all the spatial layers belonging to a plurality of data units (code words 1 and 2 in FIG. 7) described above. A transmission RF unit 19 of the mobile station 10 transmits identification information (for example, code word 1) of the data unit to which the above-described spatial layer belongs together with the identification information (for example, LI) of the spatial layer selected by the CSI calculating unit 14 to the base station 20 as the control information. That is to say, the mobile station 10 feeds back, in addition to the LI of the selected layer, the number of the code word (for example, code word 1 in FIG. 7) to which the layer belongs to the base station 20. Therefore, the number of bits of the control information transmitted/received in the CSI processes #2 and #3 increases from two bits in the above-described embodiment (refer to FIG. 9) to three bits, but data transmission with the layer with higher quality becomes possible.

Meanwhile, the EPDCCH and the PDSCH are illustrated as the physical channel to which the precoding is applied in the above-described embodiment and variation. However, the EPDCCH may also be another channel for control such as a physical downlink control channel (PDCCH), a physical control format indicator channel (PCFICH) and the like, for example. The PDSCH may also be another channel for data.

The CSI calculating unit 14 of the mobile station 10 refers to the CQI value as the indicator indicating the channel quality when selecting the code word in the above-described embodiment and variation. However, the CSI calculating unit 14 may also refer to a received signal strength indication (RSSI) value indicating radio wave strength, or a signal to interference ratio (SIR) value and the SINR value indicating a radio wave state in place of the CQI value.

Furthermore, the CSI calculating unit 14 of the mobile station 10 refers to the SINR value as the indicator indicating the reception quality when selecting the spatial layer in the above-described embodiment and variation. However, the CSI calculating unit 14 may refer to the SIR value or the RSSI value indicating the radio wave strength in place of the SINR value.

According to one aspect of a mobile station disclosed in the present application, report of a channel state from the mobile station to a base station may be realized using small control information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile station configured to perform radio communication using spatial multiplexing with a base station, the mobile station comprising:
   a controller configured to select a data unit with highest channel quality, and to select a spatial layer with highest reception quality belonging to the selected data unit; and
   a transmitter configured to transmit spatial coding information and first identification information to the base station, the spatial coding information corresponding to the number of spatial layers, and the first identification information identifying the spatial layer selected, and a layer indicator to determine a precoding matrix, wherein
   the base station determines the precoding matrix by receiving not the precoding matrix itself but only the layer indicator.

2. The mobile station according to claim 1, wherein
   the controller selects the spatial layer with the highest reception quality from the spatial layers belonging to a plurality of data units, and
   the transmitter transmits, together with the first identification information, second identification information of the data unit to which the spatial layer belongs, to the base station.

3. The mobile station according to claim 1, wherein the spatial coding information is first channel state information, and the first identification information is second channel state information.

4. The mobile station according to claim 1, wherein the transmitter transmits the first identification information of the spatial layer with a second highest reception quality to the base station as third channel state information subsequent to second channel state information.

5. The mobile station according to claim 1, wherein the transmitter transmits the first identification information after transmitting the spatial coding information.

6. The mobile station according to claim 1, wherein the controller selects the data unit with highest channel quality from a plurality of data units, and selects the spatial layer with highest reception quality from a plurality of spatial layers belonging to the selected data unit with the highest channel quality.

7. A base station configured to perform radio communication using spatial multiplexing with a mobile station, the base station comprising:
   a transmitter configured to transmit a reference signal to the mobile station; and
   a receiver configured to receive spatial coding information and identification information from the mobile station that received the reference signal, the spatial coding information corresponding to the number of spatial layers, and the identification information identifying a spatial layer with highest reception quality belonging to selected data unit by the mobile station, and a layer indicator to determine a precoding matrix, wherein
   the base station determines the precoding matrix by receiving not the precoding matrix itself but only the layer indicator.

8. The base station according to claim 7, wherein the transmitter transmits the identification information after transmitting the spatial coding information.

9. The base station according to claim 7, further comprising a controller configured to control the spatial multiplexing according to the identification information.

10. The base station according to claim 9, wherein the controller determines the spatial coding information by using the identification information, and executes the spatial multiplexing based on the spatial coding information determined.

11. A communication system comprising:
    a mobile station; and
    a base station configured to perform radio communication using spatial multiplexing with a mobile station, wherein
    the mobile station includes:
    a controller configured to select a data unit with highest channel quality, and to select a spatial layer with highest reception quality belonging to the selected data unit; and
    a transmitter configured to transmit spatial coding information and identification information to the base station, the spatial coding information corresponding to the number of spatial layers, and the identification information identifying the spatial layer selected, and a layer indicator to determine a precoding matrix,
    the base station includes:
    a receiver configured to receive the spatial coding information and the identification information, wherein
    the base station determines the precoding matrix by receiving not the precoding matrix itself but only the layer indicator.

* * * * *